W. C. BURRELL.
VEHICLE.
APPLICATION FILED OCT. 22, 1917.
1,276,172.
Patented Aug. 20, 1918.
6 SHEETS—SHEET 4.
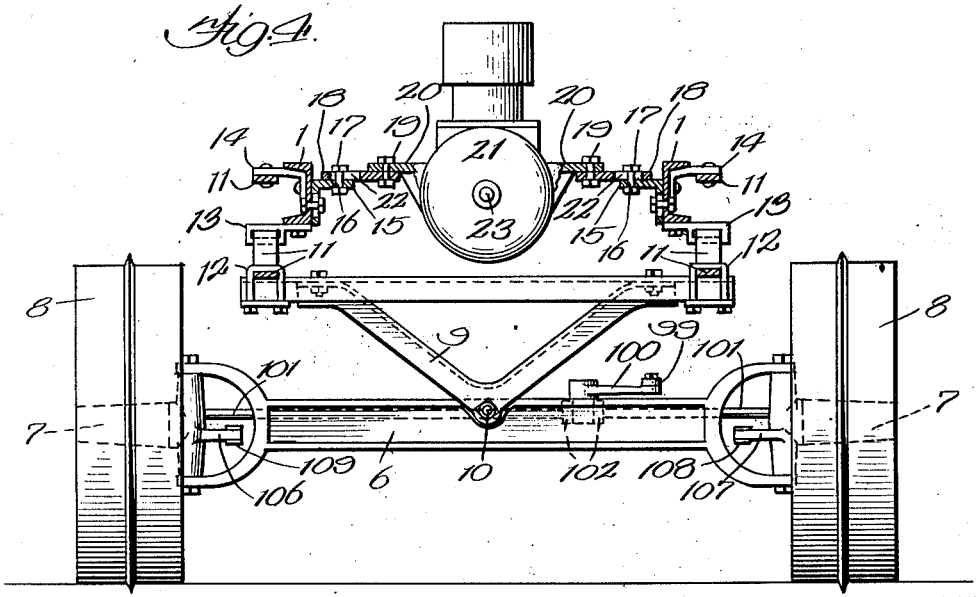
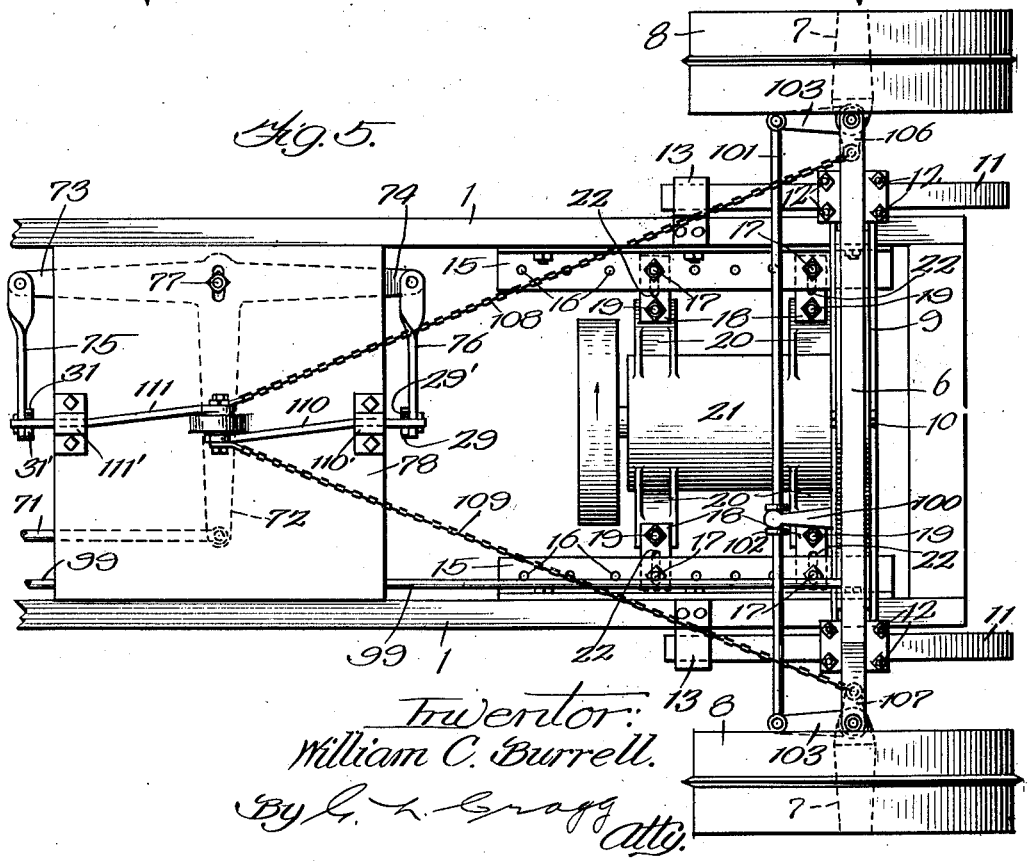
Inventor:
William C. Burrell.
By G. L. Gragg
Atty.

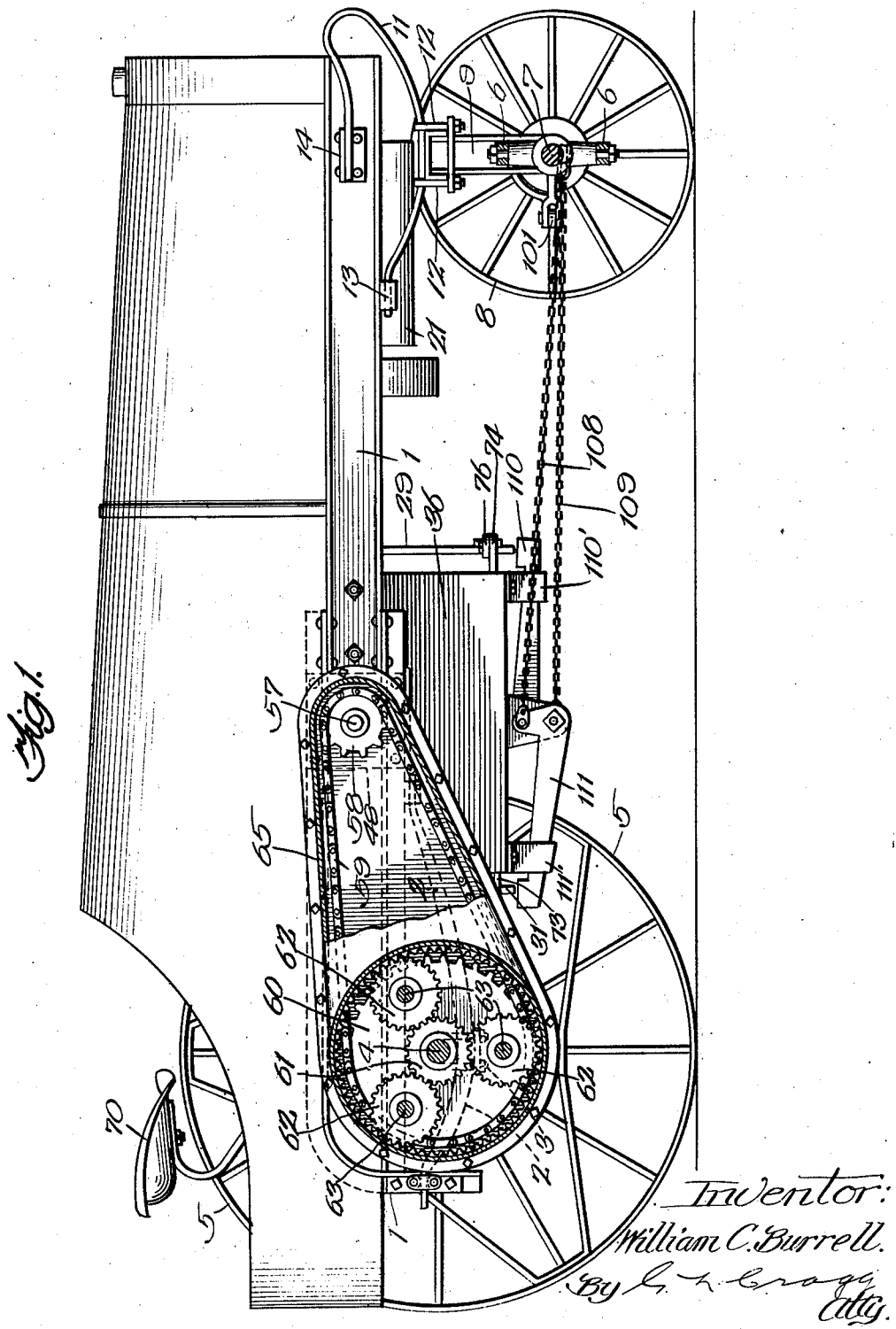

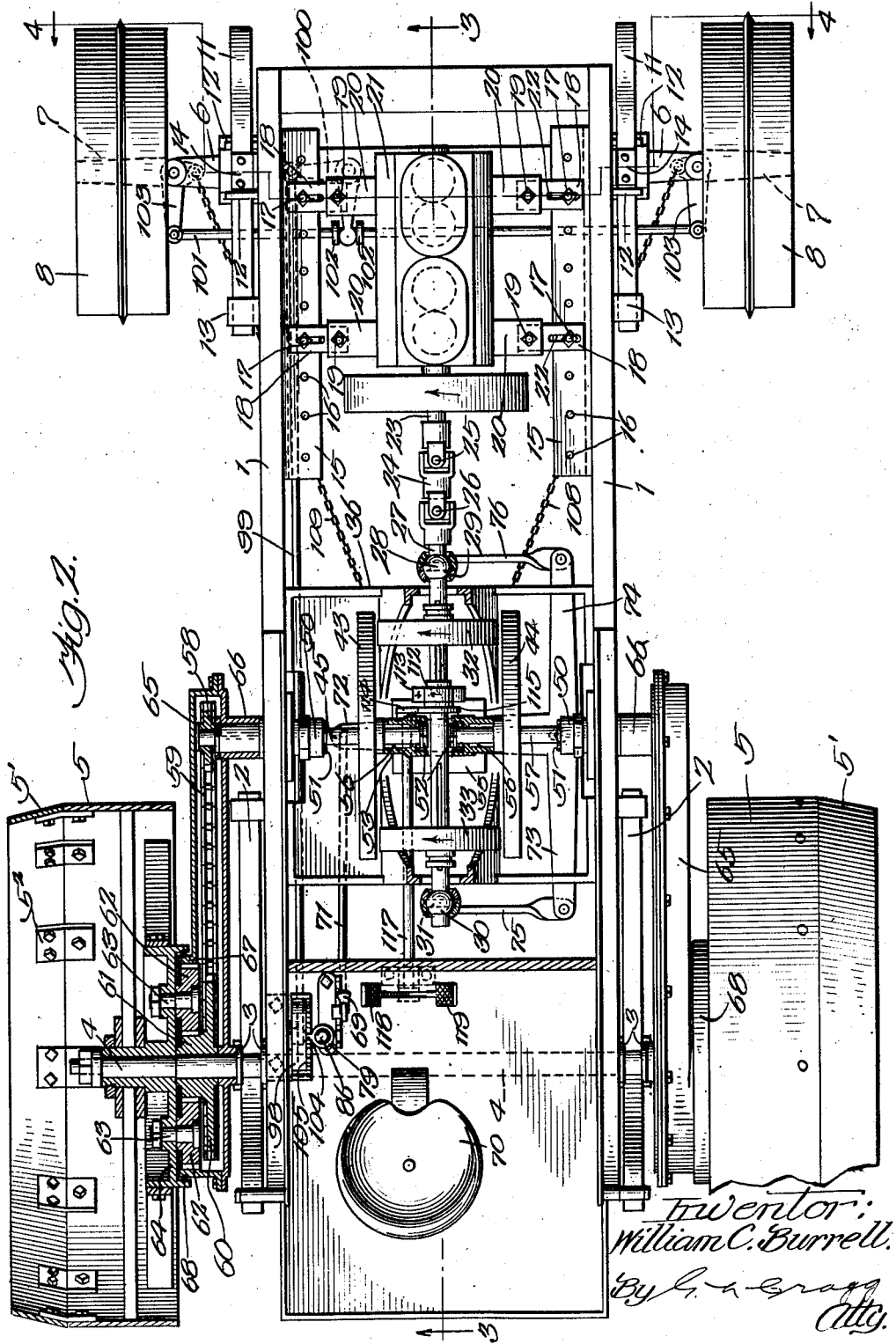

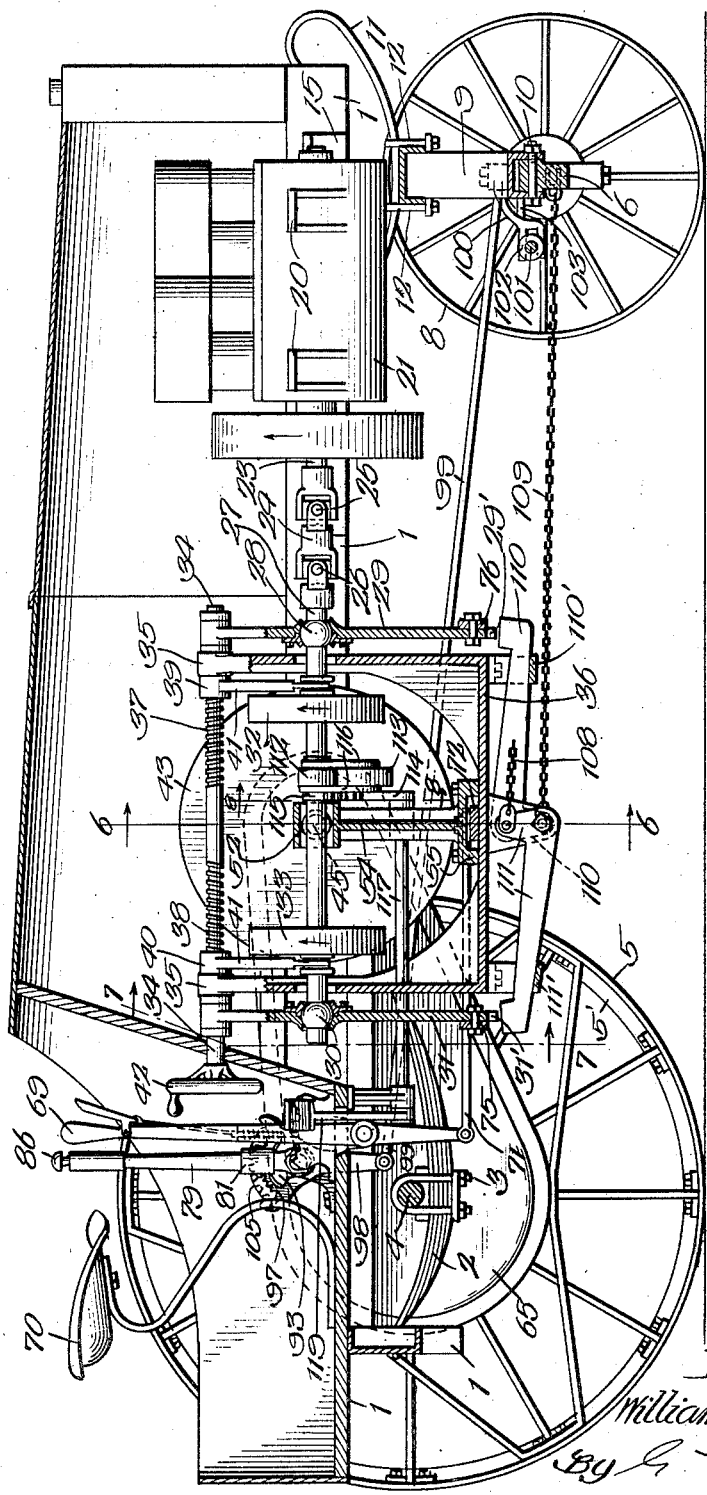

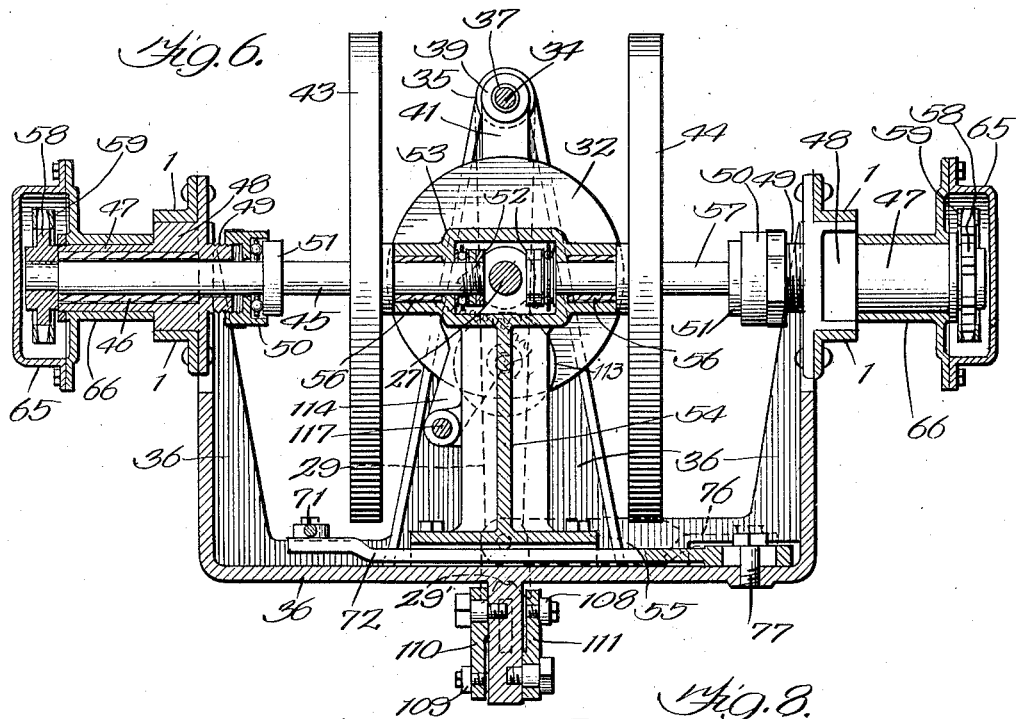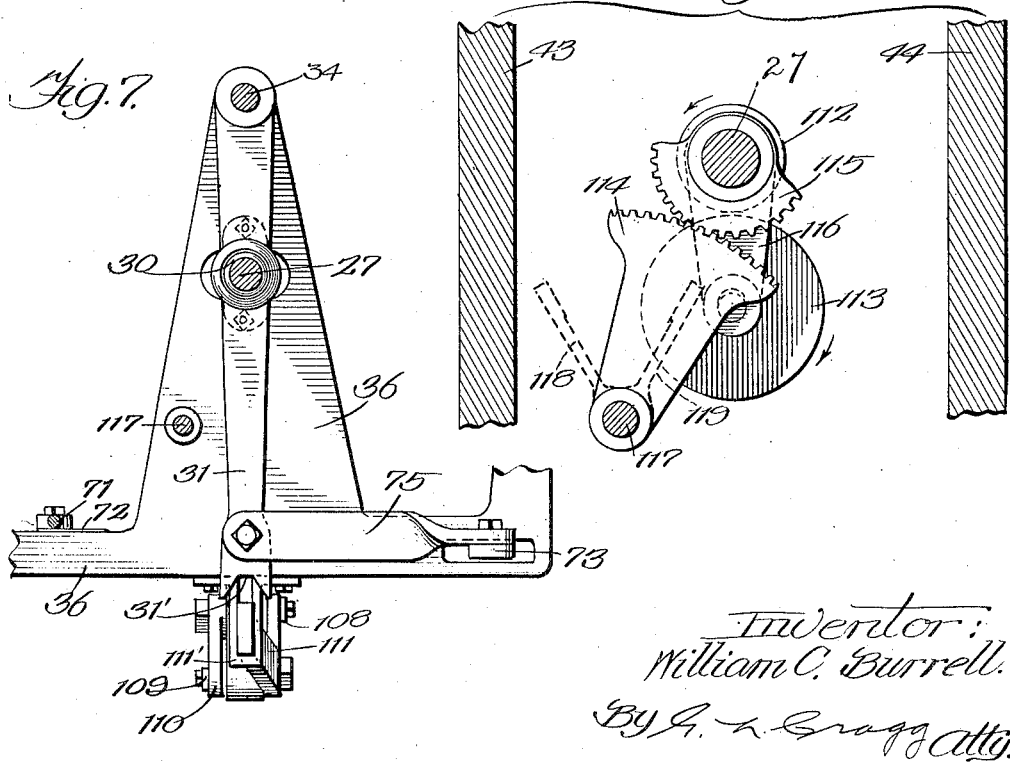

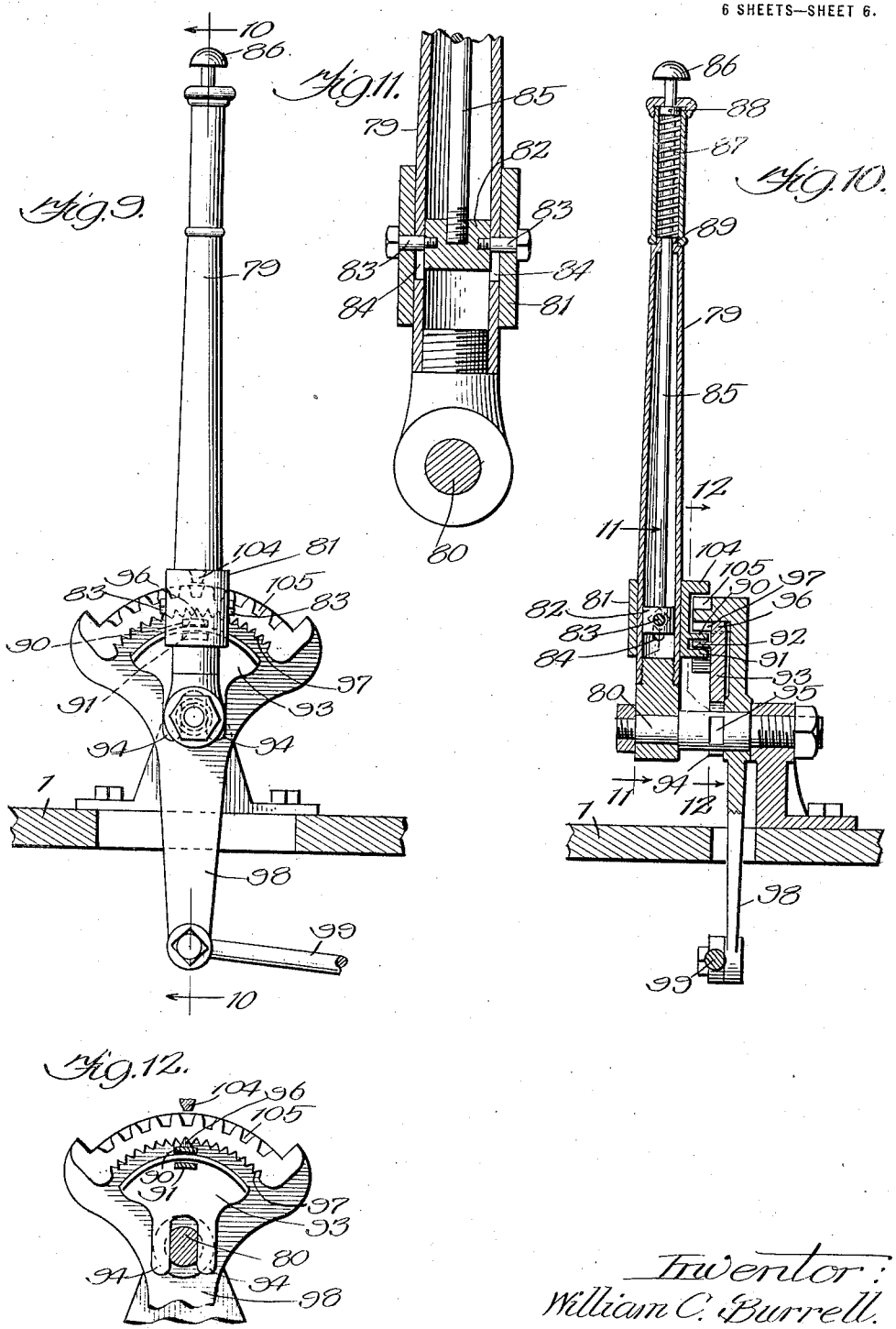

UNITED STATES PATENT OFFICE.

WILLIAM C. BURRELL, OF KANKAKEE, ILLINOIS.

VEHICLE.

1,276,172.  Specification of Letters Patent.  Patented Aug. 20, 1918.

Application filed October 22, 1917. Serial No. 197,793.

*To all whom it may concern:*

Be it known that I, WILLIAM C. BURRELL, a citizen of the United States, residing at Kankakee, in the county of Kankakee and State of Illinois, have invented a certain new and useful Improvement in Vehicles, of which the following is a full, clear, concise, and exact description.

My invention relates to vehicles and has a number of objects and advantages in view. One feature of my invention resides in the provision of a chassis frame which is adapted to receive engines of different makes and sizes, such as are initially made for inclusion in the construction of pleasure automobiles. My invention enables the ready application of such engines to chassis frames of standard construction in the formation of trucks.

My invention has also for its object the provision of improved equipment for propelling and steering motor vehicles.

The invention includes improved means for supporting the frame of a vehicle upon a vehicle axle. I have also devised a new lubricant containing case for the power transmission gearing, and also an improved construction of vehicle wheels for increasing the resistance encountered thereby as they sink into soft soil.

The invention in all of its characteristics will be fully set forth in the explanation of the preferred embodiment thereof shown in the accompanying drawings and the invention will further be particularized in the claims. In the drawings Figure 1 is a side elevation of an automobile constructed in accordance with the invention, a portion of a gear case being shown in section; Fig. 2 is a plan view of the automobile with the housing, that is shown on the chassis frame in Fig. 1, removed; Fig. 3 is a view on line 3—3 of Fig. 2; Fig. 4 is a view on line 4—4 of Fig. 2; Fig. 5 is a bottom view of the forward part of the structure; Fig. 6 is a view on line 6—6 of Fig. 3; Fig. 7 is a view on line 7—7 of Fig. 3; Fig. 8 is a view on line 8—8 of Fig. 3; Fig. 9 is a detail view illustrating a part of the steering lever mechanism; Fig. 10 is a sectional view on line 10—10 of Fig. 9; Fig. 11 is a sectional view on line 11—11 of Fig. 10; and Fig. 12 is a sectional view on line 12—12 of Fig. 10.

Like parts are indicated by similar characters of reference throughout the different figures.

The chassis frame 1 has its rear end supported upon semi-elliptical springs 2 which are clamped by U-bolts 3 upon the dead or non-rotating axle 4. The driving rear vehicle wheels 5 are mounted to turn upon and with respect to the dead axle, though I do not limit myself to a non-rotating axle upon which to mount the rear wheels. The forward end of the chassis frame is supported, by means to be set forth, upon the forward non-rotating axle 6 which carries steering knuckles upon whose branches 7 the forward steering vehicle wheels 8 are mounted to turn. A triangular cradle 9 (Fig. 4) is journaled at its inverted apex to the middle portion of the forward axle 6, there being a pivoted bolt 10 that couples the cradle with said axle. Leaf springs 11 are clamped by means of U-bolts 12 upon outer ends of the cradle 9. The rear ends of these springs are adapted to move back and forth in sockets or sleeves 13 (Figs. 1 and 2) that are carried by and project laterally from the side rails of the chassis frame 1. The forward ends of the leaf springs 11 are curled backwardly and are bolted or riveted to brackets 14 that project laterally from the side rails of the chassis frame 1. As the chassis frame, together with its load, vibrates with respect to the axle 6 the rear ends of the elliptical springs 11 work back and forth in the sleeves 13. The construction and arrangement of these springs also form an effective flexible union between the forward end of the chassis frame 1 and the cradle 9. By means of the cradle 9 the forward end of the chassis frame will not abruptly follow the tilting movement of the axle 6 as the wheels 8 encounter uneven ground. Ledges 15 margin the inner sides of the side rails of the chassis frame 1 and are provided with bolt openings 16 for the reception of the shanks of bolts 17. Clips 18 are clamped into engagement with the ledges 15 by means of the bolts 17. These clips are provided with circular holes that receive the bolts 19 whereby these clips may be bolted to the feet 20 projecting laterally from the casing of the engine or motor 21 that is to be supported upon the chassis. It being one of the objects of my invention to enable a given chassis frame to support engines of different makes, the clips 17 are provided with slots 22 whereby said clips may be adjustable with respect to the bolts 17 to enable engines that vary in dimensions between the ends of their feet to be applicable to chassis frames of standard construction. By providing a number of bolt holes 16 distributed longitudinally of the ledges 15 engines of different makes having differing spaces between their feet may be applicable to chassis frames of standard construction.

The engine shaft has its section 23 coupled with its section 24 by means of a universal joint 25. The universal joint 26 couples the shaft section 24 with the rear shaft section 27. This rear shaft section 27 has a forward ball and socket bearing 28 which is supported by the hanger 29. This same rear shaft section 27 also has a rear ball and socket bearing 30 that is supported by the hanger 31. Driving parallel friction disks 32 and 33 have splined connection with the engine shaft section 27 whereby these disks may be adjustable longitudinally of the engine shaft while rotating therewith. The hangers 29 and 31 are mounted respectively at the forward and rear ends of a shaft 34, which shaft is mounted to turn in the bearings 35 carried at the upper end of the frame 36, this frame being rigidly secured to the chassis frame 1. The shaft 34 is mounted to rotate without being movable longitudinally of itself and the hangers 29 and 31 do not turn with the shaft 34 although supported thereby, the upper ends of the hangers 29 and 31 therefore terminating in bearings through which the shaft 34 passes. Said shaft 34 is provided with oppositely directed threads 37 and 38 which are in engagement with correspondingly threaded sleeves 39 and 40. These sleeves are at the upper ends of arms 41 whose lower ends are bifurcated to straddle the hubs of the disks 32, 33, which disks are provided with annular grooves that receive the lower bifurcated ends of the arms 41. The rear end of the shaft 34 is provided with a crank wheel 42 whereby the shaft 34 may be turned in either direction to cause the wheels 32, 33 mutually to approach or mutually to separate. Parallel friction disks 43, 44, which are to be driven by the disks 32, 33, have a common axis of rotation which is always midway between the disks 32, 33, these latter disks also having a common axis of rotation which is at right angles to the axis of rotation of the disks 43, 44. The disks 43, 44 thus have planes of rotation (preferably fixed) that are at right angles to the planes of rotation of the disks 32, 33. The disk 43 is carried by a shaft 45 which has bearing rollers 46 (Fig. 6) that are located in a cylindrical sleeve 47. This cylindrical sleeve 47 terminates, at its inner end in a block 48 that is riveted to the chassis frame 1. The block 48 has an inwardly extending externally threaded sleeve 49 upon which an internally threaded collar 50 is disposed. The shaft 45 carries a collar 51 that engages balls of a ball bearing structure carried by the collar 50 whereby an end thrust bearing is constituted. The inner end of the shaft 45 carries nuts 52 that engage balls of a ball bearing structure that intervene between these nuts and the adjacent inner shoulder upon and within a sleeve 53 which is mounted, by means of a pedestal 54, upon a yoke 55 which is secured to the side rails of the chassis frame 1. This sleeve 53 incloses bearing rollers 56 that support the inner end of the shaft 45. By means of the collar 50 and the nuts 52 the plane of rotation of the disk 43 may be determined. The disk 44 is mounted upon a shaft 57, this shaft and disk being provided with bearings and adjusting devices that are similar to the bearings and adjusting devices described in connection with the disk 43 and its shaft 45. The friction disk 43 is individual to the left hand driving vehicle wheel 5 and the friction disk 44 is individual to the right hand driving vehicle wheel 5. When the vehicle is to travel forwardly the periphery of the disk 32 engages the adjacent broad face of the disk 43 and the periphery of the disk 33 engages the adjacent broad face of the disk 44 whereby the shafts 45 and 57 are turned in a direction that will revolve the wheels 5 to propel the vehicle forwardly, there being transmission mechanism between the shafts 45 and 57 and the wheels 5 that will later be described.

When the vehicle is to be propelled rearwardly the periphery of the friction disk 32 is engaged with the adjacent broad face of the disk 44 and the periphery of the disk 33 is engaged with the adjacent broad face of the disk 43. The shafts 45 and 57 are provided each with a pinion 58 upon its outer end. The gear element directly coöperating with each pinion 58, is preferably in the form of a sprocket chain 59 on which account each pinion 58 is a sprocket pinion. Each sprocket chain 59 passes over a sprocket gear 60 disposed upon and rotatable with respect to the axle 4. Each wheel 5 that is also loose upon the axle 4 has a sprocket gear 60 co-axial therewith but rotatable with respect thereto. The hub of each sprocket gear 60 carries a pinion 61 that is co-axial with and fixed with respect to the gear 60, these gear elements 60 and 61 being both co-axial with the adjacent wheel 5. Each pinion 61 is in mesh with a planetary set of pinions 62 that are mounted upon short shaft 63 that extend parallel with the axis of the axle 4 and are mounted in the hub extension 64 of the corresponding wheel 5. I employ a gear case 65 in conjunction with the gear pertaining to each vehicle wheel 5. Each gear case has an inwardly extending cylindrical extension 66 that surrounds the outer cylindrical extension of the adjacent block 48, these cylindrical extensions being co-axial with the shafts 45, 57.

The forward ends of the gear cases 65 are thus adapted to turn upon an axis that is coincident with the common axis of the disks 43, 44 and their shafts. Each gear case 65 has an outwardly extending short cylindrical extension 67 that is co-axial with the axle 4 and also constituting a non-rotating internal gear in mesh with the pinions 62. By means of this gearing the propelling vehicle wheels 5 are driven. Each hub extension 64 has an inwardly extending cylindrical extension 68 that surrounds the adjacent cylindrical extension 67 or in other words is in telescoping relation therewith. Suitable packing is disposed in the annular space that intervenes between the complemental cylindrical extensions 67, 68. Thick grease or other suitable lubricant is disposed in the gear cases and is confined therein by means of the construction just described and the gear cases themselves are automatically adapted to all relative positions that the rear vehicle wheels 5 may have with respect to the shafts 45, 57.

When the vehicle is propelled forwardly or rearwardly in a straight line the disk 32 is engaged with one of the disks 43, or 44 and the disk 33 is engaged with the remaining disk, as has been set forth. If the vehicle is to make a turn either forwardly or rearwardly but one of the disks 32, 33 may be employed. For example, if the vehicle is to be turned to the right while moving forwardly the disks 32 and 43 may be engaged and if the vehicle is to be turned to the left the disks 33 and 44 may be engaged. The universal joints 25, 26 permit of the various adjustments of the disks 32, 33 across the space between the disks 43, 44 and the mountings for the ends of the rear section 27 of the engine shaft permit required relative movements of the disks 32, 33 in the adjustment of these disks across the space between the disks 43, 44. After the desired operative adjustment of the disks 32, 33 or either of them has been effected these disks are mutually approached or mutually separated by the operation of the crank wheel 42 whereby the speed which these disks are to impart to the disks 43, 44 may be regulated. The mechanism for adjusting the disks 32, 33 laterally of the chassis and toward and from the disks 43, 44 that extend longitudinally of the chassis is inclusive of the hangers 29 and 31 which are adapted to be swung upon the shaft 34, without turning this shaft, as a consequence of the operation of the lever 69 which is accessible for operation by the operator who is seated in the seat 70. This lever 69 is connected by means of a link 71 with the stem 72 of the T-lever whose branches 73, 74 are connected by links 75, 76 with the lower ends of the hangers 29 and 31. Said T-lever has bolt and slot connection 77 with a frame piece 78 that is secured to the chassis frame 1 (Fig. 5). When the lever 69 is moved to its forward position the T-lever is turned in a direction that will swing the hanger 29 to the left and the hanger 31 to the right and apply the disk 32 to the disk 43 and the disk 33 to the disk 44, whereby the vehicle will be caused to travel forwardly. When the T-lever is moved to its rearmost position the hanger 29 will be moved to the right and the hanger 31 to the left whereby the disk 32 will be applied to the disk 44 and the disk 33 will be applied to the disk 43 to cause the vehicle to travel rearwardly. When the lever 69 is in the middle or neutral position the T-lever will have a neutral position to bring the hangers 29 and 31 in middle or neutral positions whereby the disks 32 and 33 will engage neither of the disks 43, 44, this adjustment of the lever 69 being effected when the vehicle is not to travel. This is the adjustment illustrated in Fig. 2. The lever 69 is equipped with the usual quadrant rack whereby it may be held in either of its three adjustments.

I employ a tubular lever 79 (Figs. 2, 3, 9, 10, 11 and 12) whereby the planes of rotation of the forward steering vehicle wheels 8 may be adjusted to cause the vehicle to travel in a straight path or to cause it to turn while moving forwardly or rearwardly. This lever is mounted to swing at its lower end about the axis defined by the short horizontal non-rotatable shaft 80. A coupling mechanism includes a sleeve 81 that incloses the lower end of the tubular lever 79 and which sleeve is movable longitudinally of the lever. Within the lever there is a cross head 82 that is connected by pins 83 with the sleeve 81 (Fig. 11). These pins 83 are movable in slots 84 that are provided in and extend longitudinally of the tubular lever 79. The cross head 82 has a stem 85 that projects through the upper end of the lever 79 and is provided with an operating button 86 at its upper end. A coiled spring 87 engages a collar 88 that is secured to the stem 85 near its upper end. This spring 87 is bottomed upon a shoulder located within and forming a part of the lever structure 79. Said spring presses upwardly upon the collar 88 and when the button 86 is not depressed by the operator the spring serves to lift the cross head 82 to a position limited by the engagement of the pins 83 with parts of the lever 79 at the upper ends of the slots 84. When the button 86 is depressed against the force of the spring 87 the stem 85 and the cross head 82 are depressed to an extent limited by the engagement of the pins 83 with the parts of the lever 79 at the lower ends of the slots 84. The sleeve 81 carries lugs 90, 91 between which a segmental rib 92 is received. This segmental rib is disposed upon the stem of a reciprocable fork 93 whose branches 94 constantly engage the flattened portions 95 upon the non-rotatable shaft 80, the arrangement thus being such that the fork may be adjusted transversely of the shaft without permitting the fork to be rotatable. The upper end of the fork 93 carries a tooth 96 which is confined to a single vertical line of reciprocation. This tooth 96 is engageable with the teeth of the segmental rack 97, the tooth 96 normally engaging the middle of the rack 97. The rack 97 is carried upon the upper end of a rocking lever 98 that is normally held stationary by the tooth 96. The lower end of this rocking lever is connected by a link 99 with one arm of a bell crank lever 100 (Fig. 2). The other end of this bell crank is bifurcated to straddle the steering rod 101, this bifurcated end of the bell crank being disposed between the collars 102 that are fixed upon the steering rod 101. This steering rod is connected at its ends with the rearwardly extending knuckle branches 103. When the steering vehicle wheels are to be deflected from their normal planes of rotation, in order that the vehicle may be turned, the rocking lever 98 (which may turn upon the shaft 80 but normally does not) is released from the holding influence of the tooth 96 consequent upon the full depression of the button 86 whereafter the tooth 104 carried by the sleeve 81 engages the rack 105 also carried upon the upper end of the rocking lever 98. After the tooth 104 has engaged the rack 105 the lever 79 is swung forwardly or backwardly according to the direction in which the steering vehicle wheels 8 are to be deflected from their normal planes of rotation. If the steering vehicle wheels 8 are to be maintained in deflected adjustment for an appreciable time the button 86 may be released to permit the tooth 96 to engage a part of the rack 97 corresponding to the adjusted position of the lever 79. When the vehicle has been turned to the desired extent the wheels 8 are restored to their normal planes of rotation by swinging the lever 79 back to normal position (while the button 86 is depressed). The operation of the lever thus described is that which occurs when the steering vehicle wheels 8 are to be swerved within normal ranges. When these wheels are to be swerved beyond their normal ranges the lever 79 is first swung, to turn the vehicle quickly, before the button 86 is depressed, to bring the tooth 104 nearer one end or the other of the rack 105 whereafter the button 86 is fully depressed to disengage the tooth 96 from the rack 97 and to engage the tooth 104 near one end or the other of the rack 105. This enables the attendant more readily to give a greater swing to the lever 79 to cause a greater swerving movement of the steering vehicle wheels 8. The operator may also give a series of small oscillations of the lever 79 (by alternately pressing and releasing the button 86) to swerve the wheels 8 as sharply as desired. The rack 105 and the rocking arm 98 are caused to occupy the neutral position illustrated in Fig. 9 before the attendant releases the lever 79 whereupon the parts are restored to the positions shown.

The knuckle branches 106, 107 have attached thereto the forward ends of the chains or links 108, 109. The rear end of chain 109 is connected with the short arm of a bell crank 110. The rear end of the chain 108 is connected with the short arm of a bell crank 111. The rear end of the long arm of bell crank 111 is normally out of engagement with the hanger 31 but is adapted to be engaged in the tapering notch 31$^1$ provided in the lower end of the hanger 31 when the chain 108 is pulled forwardly upon turning the wheels 8 to the right, this bell crank having a guide 111$^1$ to direct it into and out of the tapering notch 31$^1$. As a consequence of this operation the hanger 31 is thrown to a central position (Fig. 7) if it should not already be there, whereby the adjacent disk 33 is thrown to a neutral position, leaving only the disk 32 in engagement with the selected disk 43 or 44. The front end of the long arm of the bell crank 110 is normally out of engagement with the hanger 29 but is adapted to be engaged in the tapering notch 29$^1$ (similar to notch 31$^1$) provided in the under end of the hanger 29 when the chain 109 is pulled forwardly upon the turning of the wheels 8 to the left, this bell crank having a guide 110$^1$ similar to guide 111$^1$ to direct it into and out of the tapering notch 29$^1$. As a consequence of this operation the hanger 29 is thrown to a central position, if it should not already be there, whereby the adjacent disk 32 is thrown to a neutral position, leaving only the disk 33 in engagement with the selected disk 43 or 44.

Referring more particularly to Figs. 2, 3 and 8, I have there illustrated an additional friction disk 112 that is rigidly secured to the rear section of the engine shaft and has a plane of rotation parallel to the planes of rotation of the disks 32, 33 and transverse to the planes of rotation of the disks 43, 44. Another friction disk 113 is located in the same plane with the disk 112 but is normally separated therefrom, this disk therefore also having a plane of rotation that is transverse to the planes of rotation of the disks 43, 44 and being mounted to move across the space between the disks 43, 44 for selective engagement with either of these latter disks. Upon such engagement the peripheries of the disks 112 and 113 are also engaged. A segmental rack 114 is in engagement with the segmental rack 115. Arms 116 are fixed with respect to the rack 115, these arms and this rack being journaled upon the rear section 27 of the engine shaft. The shaft of disk 113 is received in elongated openings in the lower ends of the arms 116 whereby this disk 113 is movable into engagement with the disk 112 and out of such engagement. The rack 114 is fixed upon the shaft 117 which carries pedals 118 and 119 adjacent the seat 70. By pressing the pedal 118 downwardly to the left the rack 114 is turned to the left to turn the rack 115 to the left whereby the arms 116 are turned to the left. The disk 113 is thereby thrown into engagement with the disk 43 (it being assumed that the disks 32, 33 are in neutral positions) and is forced into engagement with the disk 112 whereby the left hand driving vehicle wheel 5 is alone turned in a direction to move the vehicle backwardly in a straight line or in a curve according to the adjustment of the steering mechanism. By pressing the pedal 119 downwardly to the right the rack 114 is turned to the right to turn the rack 115 to the right whereby the arms 116 are turned to the right. The disk 113 is thereby thrown into engagement with the disk 44 (it being assumed that the disks 32 and 33 are still in neutral positions) and is forced into engagement with the disk 112 whereby the right hand driving vehicle wheel 5 is alone turned in a direction to move the vehicle forwardly in a straight line or in a curve according to the adjustment of the steering mechanism. The disk 113 is located near the centers of the disks 43, 44 whereby slow movement is imparted to the disks 43, 44 with correspondingly increased power, the pedal 118 or 119 being employed when the disks 32, and 33 are near the peripheries of the disks 43, 44 and it is not desired to take time to bring the disks 32, 33 near enough to the centers of the disks 43, 44 to have the desired increase in power.

Each of the wheels 5 is shown as being provided with a conical tread flange 5¹ whose base merges with the cylindrical tread portion of the wheel. By constructing these wheels in this way they are especially adapted to ride over soft soil. When the wheels run on hard soil the conical tread portions thereof are not materially in contact therewith but are brought increasingly into contact with the soil, where soft soil is encountered, as the wheels sink into the same whereby the resistance to further sinking of the wheels is very rapidly and materially increased over that which is due to the cylindrical portions of the wheels alone. The conical tread portions 5¹ are desirably separably secured to the cylindrical tread portions of the wheels 5 by means of clips 5² so that these conical portions may readily be omitted where the soil is of such a nature that the wheels are not likely to sink therein.

There are a number of characteristics of the vehicle of my invention that are not to be limited to inclusion in motor vehicles, as will be apparent to those who have made themselves familiar with the different characteristics of my invention.

While I have herein shown and particularly described the preferred embodiment of my invention I do not wish to be limited to the precise details of construction shown as changes may readily be made without departing from the spirit of my invention, but having thus described my invention I claim as new and desire to secure by Letters Patent the following:—

1. A motor vehicle including a chassis frame; a motor on the chassis frame; a motor shaft; friction disks rotatable with and movable on the shaft longitudinally thereof; other friction disks disposed in planes transverse to the first friction disks and between which the first friction disks are disposed, the aforesaid shaft and the friction disks thereon being movable transversely of the space between the other friction disks; power transmission means intervening between the last aforesaid friction disks and the propelling vehicle wheels; hangers supporting said shaft in the region of the friction disks that are on the shaft; and mechanism for individually adjusting the hangers.

2. A motor vehicle including a chassis frame; a motor on the chassis frame; a motor shaft; friction disks rotatable with and movable on the shaft longitudinally thereof; other friction disks disposed in planes transverse to the first friction disks and between which the first friction disks are disposed, the aforesaid shaft and the friction disks thereon being movable transversely of the space between the other friction disks; power transmission means intervening between the last aforesaid friction disks and the propelling vehicle wheels; hangers supporting said shaft in the region of the friction disks that are on the shaft; a rotatable shaft upon which said hangers are mounted to swing, said shaft having two sets of threads that are opposite; an arm in connection with each threaded portion of the latter shaft and in thrusting relation to the friction disks that are upon the engine shaft, the axis of rotation of the other friction disks being midway between the friction disks that are upon the engine shaft; and mechanism for individually adjusting the hangers.

3. A motor vehicle including a chassis frame; a motor on the chassis frame; a motor shaft; friction disks rotatable with and movable on the shaft longitudinally thereof; other friction disks disposed in planes transverse to the first friction disks and between which the first friction disks are disposed, the aforesaid shaft and the friction disks thereon being movable transversely of the space between the other friction disks; power transmission means intervening between the last aforesaid friction disks and the propelling vehicle wheels; hangers supporting said shaft in the region of the friction disks that are on the shaft; mechanism for individually adjusting the hangers; steering mechanism for selecting the planes in which the steering vehicle wheels will rotate; and mechanism controlled by the steering mechanism for holding one or the other of the friction disks that are upon the engine shaft out of engagement with each of the remaining friction disks.

4. A motor vehicle including its propelling vehicle wheels; a pair of friction disks in gear connection therewith for effecting the propelling rotation thereof; a motor shaft; a third friction disk in a plane transverse to the planes of the aforesaid friction disks and turned by the motor shaft; a fourth friction disk whose periphery is engaged with the periphery of the third friction disk, this fourth friction disk being also disposed in a plane transverse to the planes of the first aforesaid friction disks; an arm structure supporting the fourth friction disk; a segmental rack connected with the arm structure; a second segmental rack meshing with the aforesaid segmental rack; and mechanism whereby the second segmental rack may be turned to turn the first segmental rack to adjust said arm structure to bring the fourth friction disk into engagement with one or the other of the aforesaid pair of friction disks.

5. A motor vehicle including its propelling vehicle wheels; a pair of friction disks in gear connection therewith for effecting the propelling rotation thereof; a motor shaft; a third friction disk in a plane transverse to the planes of the aforesaid friction disks and turned by the motor shaft; a fourth friction disk whose periphery is engaged with the periphery of the third friction disk, this fourth friction disk being also disposed in a plane transverse to the planes of the first aforesaid friction disks; an arm structure supporting the fourth friction disk and in which arm structure the fourth friction disk is adapted to move into and out of engagement with the third friction disk; a segmental rack connected with the arm structure; a second segmental rack meshing with the aforesaid segmental rack; and mechanism whereby the second segmental rack may be turned to turn the first segmental rack to adjust said arm structure to bring the fourth friction disk into engagement with one or the other of the aforesaid pair of friction disks and consequently with the third friction disk.

6. A motor vehicle including its propelling vehicle wheels; a pair of friction disks in gear connection therewith for effecting the propelling rotation thereof; a motor shaft; a third friction disk in a plane transverse to the planes of the aforesaid friction disks and turned by the motor shaft; a fourth friction disk whose periphery is engaged with the periphery of the third friction disk, this fourth friction disk being also disposed in a plane transverse to the planes of the first aforesaid friction disks; an arm structure supporting the fourth friction disk; and means whereby said arm structure may be swung to bring the fourth friction disk into engagement with one or the other of the aforesaid pair of friction disks.

7. A motor vehicle including its propelling vehicle wheels; a pair of friction disks in gear connection therewith for effecting the propelling rotation thereof; a motor shaft; a third friction disk in a plane transverse to the planes of the aforesaid friction disks and turned by the motor shaft; a fourth friction disk whose periphery is engaged with the periphery of the third friction disk, this fourth friction disk being also disposed in a plane transverse to the planes of the first aforesaid friction disks; an arm structure supporting the fourth friction disk and in which arm structure the fourth friction disk is adapted to move into and out of engagement with the third friction disk and means whereby said arm structure may be swung to bring the fourth friction disk into engagement with one or the other of the aforesaid pair of friction disks and consequently with the third friction disk.

8. A motor vehicle including its propelling vehicle wheels; a pair of friction disks in gear connection therewith for effecting the propelling rotation thereof; a motor shaft; a third friction disk in a plane transverse to the planes of the aforesaid friction disks and turned by the motor shaft; a fourth friction disk whose periphery is engaged with the periphery of the third friction disk, this fourth friction disk being also disposed in a plane transverse to the planes of the first aforesaid friction disks; and mechanism whereby the fourth friction disk is brought into engagement with one or the other of the aforesaid pair of friction disks.

9. A motor vehicle including a chassis frame; a motor on the chassis frame; a motor shaft; friction disks rotatable with and movable on the shaft longitudinally thereof; other friction disks disposed in planes transverse to the first friction disks and between which the first friction disks are disposed and are movable transversely to the planes thereof, these other friction disks being each individual to a propelling vehicle wheel and in driving relation thereto; and mechanism whereby either of the first aforesaid disks may be engaged with either of the latter aforesaid disks while the other of the first aforesaid disks is engaged with the remaining one of the latter aforesaid disks.

10. A motor vehicle including a chassis frame; a motor on the chassis frame; a motor shaft; friction disks rotatable with and movable on the shaft longitudinally thereof; other friction disks disposed in planes transverse to the first friction disks and between which the first friction disks are disposed and are movable transversely to the planes thereof, these other friction disks being each individual to a propelling vehicle wheel and in driving relation thereto; mechanism whereby either of the first aforesaid disks may be engaged with either of the latter aforesaid disks while the other of the first aforesaid disks is engaged with the remaining one of the latter aforesaid disks; and mechanism whereby either of the first aforesaid disks may have engagement with either of the latter aforesaid disks while holding the remaining one of the first aforesaid disks out of engagement with each of the latter aforesaid disks.

11. A motor vehicle including a chassis frame; a motor on the chassis frame; a motor shaft; friction disks rotatable with and movable on the shaft longitudinally thereof; other friction disks disposed in planes transverse to the first friction disks and between which the first friction disks are disposed and are movable transversely to the planes thereof, these other friction disks being each individual to a propelling vehicle wheel and in driving relation thereto; and mechanism whereby either of the first aforesaid disks may have engagement with either of the latter aforesaid disks while holding the remaining one of the first aforesaid disks out of engagement with each of the latter aforesaid disks.

12. A motor vehicle including a chassis frame; a motor on the chassis frame; a motor shaft; friction disks rotatable with and movable on the shaft longitudinally thereof; other friction disks disposed in planes transverse to the first friction disks and between which the first friction disks are disposed and are movable transversely to the planes thereof, these other friction disks being each individual to a propelling vehicle wheel and in driving relation thereto; and mechanism whereby one of the first aforesaid disks may have engagement with either of the latter aforesaid disks while holding the remaining one of the first aforesaid disks out of engagement with each of the latter aforesaid disks.

In witness whereof, I hereunto subscribe my name this 17th day of October A. D., 1917.

WILLIAM C. BURRELL.